United States Patent [19]

Atobe

[11] Patent Number: 4,585,182

[45] Date of Patent: Apr. 29, 1986

[54] TIME MEASURING DEVICE FOR A FISHING REEL

[75] Inventor: Takashi Atobe, Tokyo, Japan

[73] Assignee: Daiwa Seiko Inc., Tokyo, Japan

[21] Appl. No.: 687,556

[22] Filed: Dec. 28, 1984

[30] Foreign Application Priority Data

Jan. 25, 1984 [JP] Japan ................................ 59-8693[U]

[51] Int. Cl.⁴ .......................................... A01K 89/015
[52] U.S. Cl. ................. 242/84.1 M; 33/138;
254/276
[58] Field of Search ..................... 242/84.1 R, 84.1 K,
242/84.42, 84.8, 106, 84.1 M; 33/138, 140;
254/276

[56] References Cited

U.S. PATENT DOCUMENTS

| 2,089,031 | 8/1937 | MacDonald ................... 242/84.1 M |
| 3,612,425 | 10/1971 | Shakespeare et al. .......... 242/84.1 R |
| 4,181,960 | 1/1980 | Tateishi et al. ........................ 33/138 |
| 4,376,350 | 3/1983 | Bednarz et al. ...................... 242/106 |
| 4,384,427 | 5/1983 | Christiansen ................... 242/84.1 A |

Primary Examiner—Billy S. Taylor
Attorney, Agent, or Firm—Browdy and Neimark

[57] ABSTRACT

A double-bearing fishing reel has a spool shaft with a spool secured thereto. The spool shaft is supported between a pair of right and left reel side plates. A handle shaft is rotatably supported by one of the reel side plates. The handle shaft and the spool shaft are connected through a power transmission mechanism and a clutch mechanism, which are provided in the one reel side plate. The reel further has a level-wind device provided forward of the spool. The level-wind device is adapted to guide a fishing line to the spool. The reel is provided with an informing mechanism for informing the angler of the amount of the fishing line that has been let out. The mechanism is composed of a detector which detects the number of revolutions of the spool and the direction of rotation thereof, a display, an operation key, a microcomputer, a power source and so forth. The informing mechanism is housed in a waterproof housing which is fitted between the right and left reel side plates such as to be positioned forward of the fishing line winding region of the spool and above the level-wind device. In this case, the detector is disposed such as to be spaced a minute distance from and facing a transmitter member provided on a flange of the spool.

3 Claims, 5 Drawing Figures

TIME MEASURING DEVICE FOR A FISHING REEL

BACKGROUND OF THE INVENTION

1. Field of the Invention

The present invention relates to an improvement in a double-bearing fishing reel incorporating a mechanism for informing the angler of the amount of line that has been let out from the reel.

2. Description of the Prior Art

One type of double-bearing fishing reel is provided in its body with a mechanism for informing the angler of the amount of fishing line that has been let out from the reel. A typical informing mechanism is composed of a detector which detects the number of revolutions of the spool of the reel and the direction of rotation thereof, a display, a microcomputer, a power source and so forth. Known double-bearing fishing reels incorporating such an informing mechanism include those shown in the specifications of Japanese Patent Publication No. 15847/1982 and Japanese Utility Model publication No. 40788/1982. The conventional informing mechanism, however, suffers the following disadvantages: Since the constituent elements thereof, such as the detector, the microcomputer and the power source, are incorporated in the reel body as separate members, it is extremely troublesome to assemble the informing mechanism when the reel is produced. Further, it is not easy to attach and detach the mechanism in relation to the reel body when repairing or replacing the power source. Furthermore, the informing mechanism is not waterproof and is easily damaged by impact.

The constituent elements the conventional informing mechanism, such as the display and the operation unit, are disposed in such a manner that they cover the reel operation region above the spool, and this configuration greatly inconveniences the angler when he applies brakes to the spool while letting out the fishing line or when he straightens a backlash of the fishing line. Furthermore, when operating a small reel such as a bait casting reel, the angler normally grips the fishing rod with his hand in such a manner that the upper region of one of the sides of the reel is covered by the palm of his hand; consequently, the angler may in advertently touch an operation key with his thumb, thereby causing malfunction.

SUMMARY OF THE INVENTION

It is a primary object of the present invention to improve the conventional fishing reel incorporating an informing mechanism, thereby overcoming the above-described disadvantages of the prior art.

To this end, according to a first aspect of the present invention, there is provided a fishing reel in which the informing mechanism for informing the angler of the amount of fishing line which has been let off the reel, which is composed of a detector, a display, an operation unit, a microcomputer, a power source and so forth, is housed in a waterproof housing such that these constituent elements are united, thereby facilitating the mounting of the informing mechanism on the reel body. By virtue of this arrangement, the assembly of the mechanism when producing the fishing reel is simplified, and the operation of attaching and detaching the informing mechanism in relation to the reel body is facilitated when repairing or replacing a constituent element. Further, the informing mechanism is advantageously improved in that it is waterproof and is relatively insensitive to impact.

In a second aspect of the present invention, there is provided a fishing reel in which an informing mechanism for informing the angler of the amount of which has been let off the feel which is composed of a detector, a display, an operation unit, a microcomputer, a power source and so forth, is housed in a waterproof housing such that these constituent elements are united, and in which the housing is constituted by a horizontal part and a vertical part extending downward from one side of the horizontal part and is fitted between a pair of right and left reel side plates such that the horizontal part is located forward of the fishing line winding portion of the spool and above the level-wind device for the fishing line. Thus, the upper side of the spool is opened, so that there is no possibility that any constituent element of the informing mechanism may interfere with an operation effected by the angler, such as application of brakes to the spool during winding off of the fishing line or straightening of backlash of the fishing line. The horizontal part constituting one part of the housing is designed so as to allow the angler to place on a portion of the horizontal part the thumb of his hand holding the reel together with the fishing rod, whereby the angler can hold the reel steady when he effects a fishing operation. Furthermore, the horizontal part protects the level-wind device so as to prevent the device from colliding with any obstacle or from being touched by a finger of the angler's hand gripping the fishing rod. Thus, the fishing reel greatly facilitates fishing.

In a third aspect of the present invention, there is provided a fishing reel in which the operation unit constituting a part of the informing mechanism for informing the angler of a wind-off amount of the fishing line is disposed on the upper surface of the distal end portion of the waterproof housing, that is, a portion thereof which is closer to one of the reel side plates in which a spool driving mechanism is housed, thereby preventing any operation key in the operation unit from being mistakenly actuated by the thumb of the angler's hand holding the reel together with the fishing rod during a fishing operation.

In a further aspect of the present invention, there is provided a fishing reel in which the power source constituting a part of the informing mechanism is housed in the vertical part constituting one part of the waterproof housing, and a cover which is removed and remounted when the power source is loaded or unloaded is provided on the side of the vertical part such as to project therefrom, the projecting portion of the cover being fitted into a through-hole formed in the side surface of the above-described reel side plate, whereby any vertical movement of the housing is prevented, loading and unloading or replacing the power source is facilitated.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
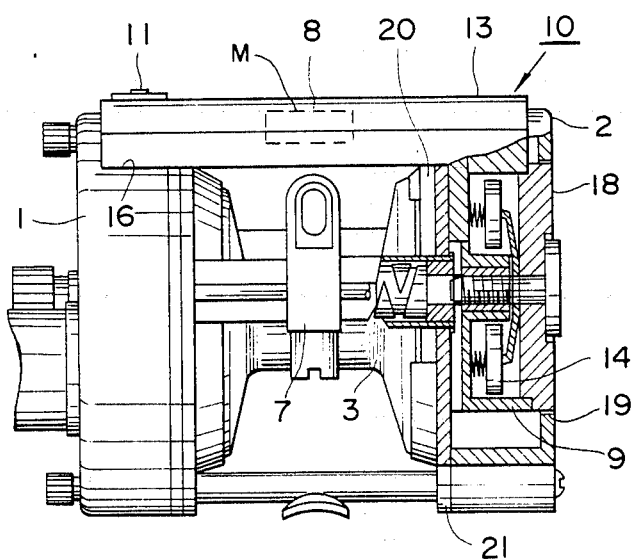
FIG. 1 is a partial cutaway front elevation view of one embodiment of the present invention.
Figure 2:
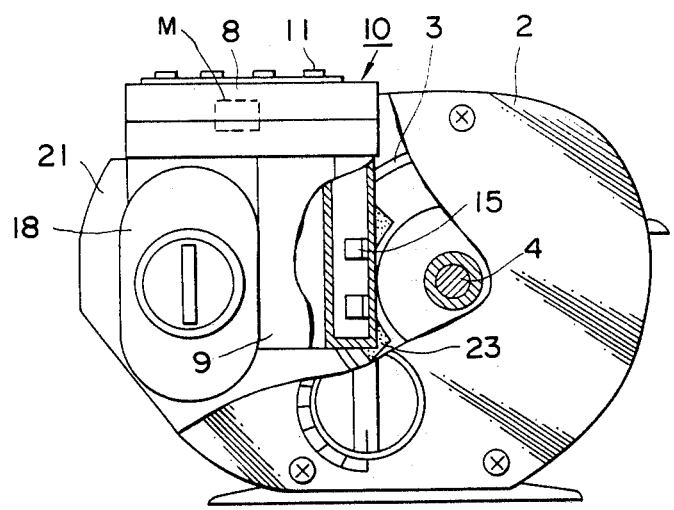
FIG. 2 is a partial cutaway side elevation view of the embodiment shown in FIG. 1 as viewed from the right-hand side thereof.
Figure 3:
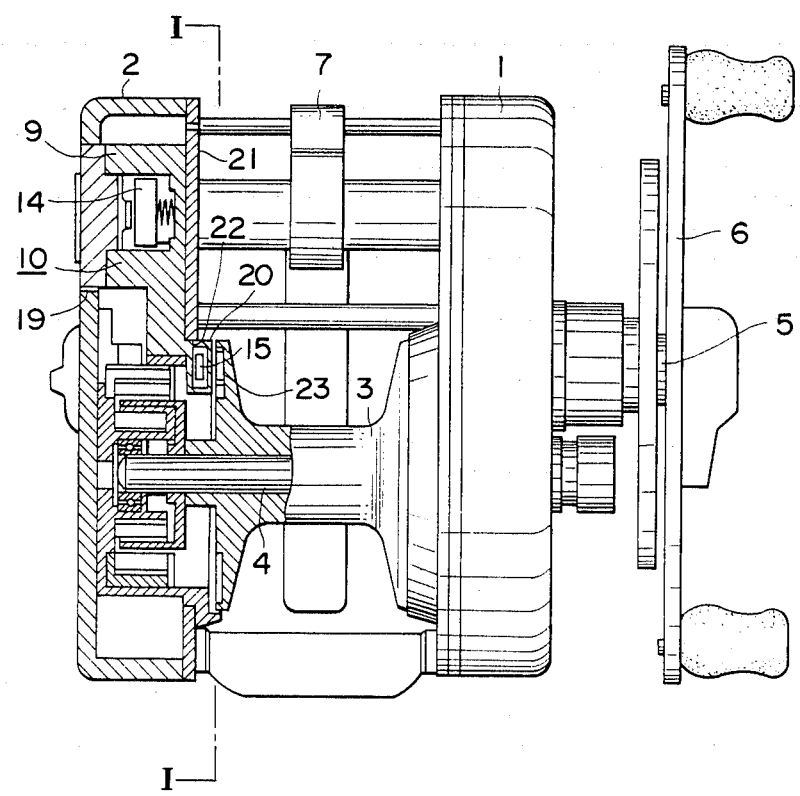
FIG. 3 is a partial cutaway plan view of the embodiment shown in FIG. 1.
Figure 4:
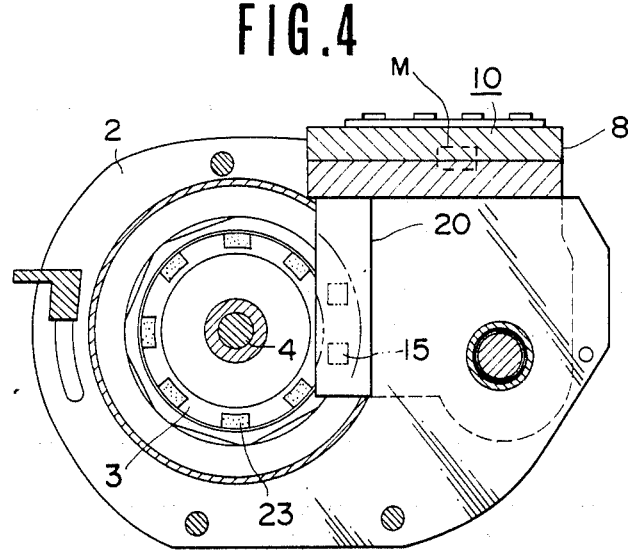
FIG. 4 is a cross section view taken along the line I—I of FIG. 3.
Figure 5:
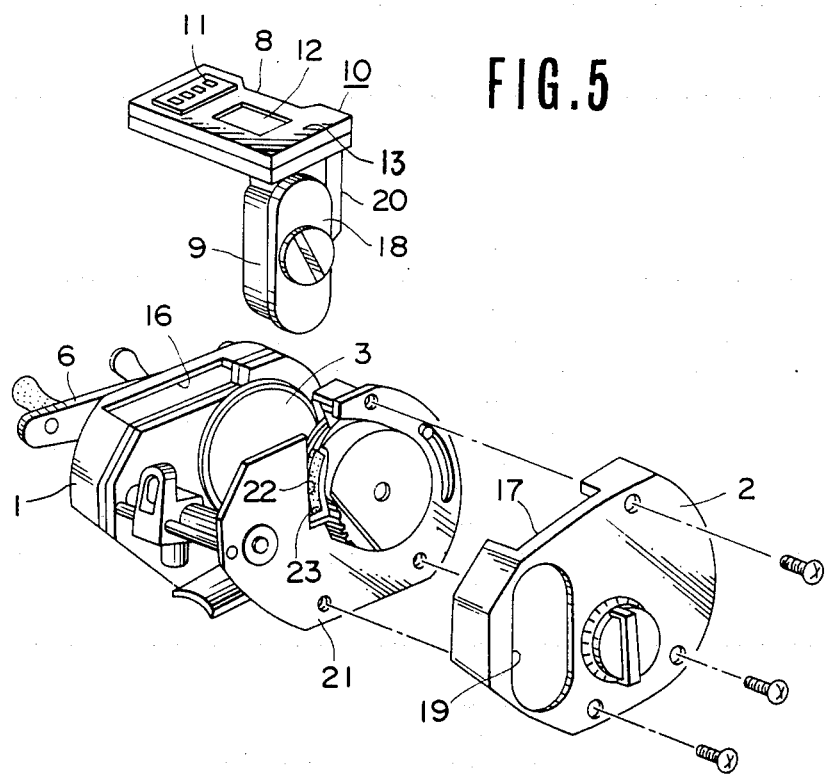
FIG. 5 is an exploded perspective view of the embodiment shown in FIG. 1.

One embodiment of the present invention will be described hereinunder with reference to the accompanying drawings.

A spool shaft 4 having a spool 3 secured thereon is rotatably supported between reel side plates 1, 2 of a double-bearing fishing reel. The spool shaft 4 is connected to a handle shaft 5 supported by the reel side plate 1 through a power transmission mechanism (not shown) and a clutch mechanism (not shown), which are familiar mechanisms installed inside the reel side plate 1, whereby a fishing line can be wound on the spool 30 by turning a handle 6. Further, a familiar level-wind device 7 is provided between the reel side plates 1, 2 forwardly of the spool 3.

A waterproof housing 10 is constituted by a horizontal part 8 and a vertical part 9 which is integrally formed with the lower portion of the horizontal part 8 at one of the sides thereof. The waterproof housing 10 is water-proofed in a manner known in the art formed in an inverted L shape by these parts 8, 9. Operation keys 11 are provided on the upper surface of the distal end portion of the horizontal part 8. A display 12 is provided in the central portion of the horizontal part 8. An area where the angler may place his thumb 13 is provided on the upper surface of the portion of the horizontal part 8 under which the vertical part 9 is formed. A microcomputer M is housed in a proper portion inside the horizontal part 8. A power source 14 is incorporated in the front region of the vertical part 9. In the rear region thereof, a detector 15 is incorporated which detects the number of revolutions of the spool 3 and the direction of rotation thereof.

The horizontal part 8 of the waterproof housing 10 is detachably fitted into notches 16, 17 respectively formed in the forward upper portions of the reel side plates 1, 2. Thus, the horizontal part 8 covers the upper side of the level-wind device 7 such as to protect the device 7. The vertical part 9 is accommodated inside the reel side plate 2 in which the power transmission and the clutch mechanism are not disposed. A cover 18 which is removed when the power source 14 is loaded or unloaded is fitted into a through-hole 19 formed in the outer surface of the reel side plate 2. Further, a projecting edge 20 of the portion of the vertical part 9 in which the detector 15 is housed is engaged with an engagement notch 22 formed in a frame board 21 such that the detector 15 opposes a transmitter member 23 provided on a flange of the spool 3.

In the above-described embodiment, a magnet is employed as the transmitter member 23, and a magnetic sensor is used as the detector 15. However, this magnetic detecting system is not an exclusive requirement and, for example, an optical detecting system may be employed.

In the present invention arranged as described above, the amount of the fishing line having been let out is detected by detecting the rotation of the spool 3 by the detector 15 and is displayed on the display 12. The amount of the fishing line to be let out is set by actuating the operation keys 11. Further, the replacement of a cell constituting the power source 14 is carried out by removing and remounting the cover 18.

When fishing with a small reel in which the angler normally grips the fishing rod with his hand in such a manner that the upper part of one of the sides of the reel is covered inside the palm of the hand, the angler places the thumb of his hand gripping the rod on the thumb placing area 13 of the horizontal part 8, thereby holding the reel steady when fishing.

As has been described above, the informing mechanism, composed of the detector which detects the number of revolutions of the spool and the direction of rotation thereof, the display, the microcomputer, the power source and so forth, is incorporated as one integral unit by being housed in the inverted L-shaped waterproof housing consisting of the horizontal part and the vertical part, and the housing is detachably fitted between the reel side plates forwardly of the spool such as to cover the upper side of the level-wind device. It is, therefore, possible to unite the constituent elements of the informing mechanism which is operated to set, display and control the amount of fishing line that has been let out, and the united informing mechanism can be easily incorporated in the reel body. Accordingly, it is possible to facilitate the assembly of the informing mechanism when producing the reel and the repair of the mechanism or the replacement of a constituent element thereof. Further, the informing mechanism unit is reliably waterproof and is highly resistant to impact. In addition, the housing is designed so as to allow any fishing operation to be smoothly and easily effected. Thus, the present invention has advantageous features and utility,

What is claimed is:

1. In a double-bearing fishing reel having a spool shaft with a spool secured thereto, the spool shaft being supported between a pair of right and left reel side plates; a handle shaft rotatably supported by one of said reel side plates, the handle shaft and said spool shaft being connected together through a power transmission mechanism and a clutch mechanism, which are provided in said one reel side plate; and a level-wind device provided forward of said spool, the level-wind device being adapted to guide a fishing line to said spool, an improvement comprising:

an informing mechanism for informing the angler of the amount of the fishing line that has been let out, the informing mechanism being composed of a detector which detects the number of revolutions of said spool and the direction of rotation thereof, a display, an operation key, a microcomputer, and a power source; and a waterproof housing which houses said informing mechanism, the housing being supported between said right and left reel side plates and located forward of a fishing line winding portion of said spool and above said level-wind device, and said detector being disposed a minute distance apart from, and spacing, a transmitter member disposed on a flange of said spool.

2. In a double-bearing fishing reel having a spool shaft with a spool secured thereto, the spool shaft being supported between a pair of right and left reel side plates; a handle shaft rotatably supported by one of said reel side plates, the handle shaft and sahd spool shaft being connected together through a power transmission mechanism and a clutch mechanism, which are provided in said one reel side plate; and a level-wind device provided forward of said spool, the level-wind device being adapted to guide a fishing line to said spool, an improvement comprising:

an informing mechanism for informing the angler of the amount of fishing line that has been let out, the informing mechanism being composed of a detector which detects the number of revolutions of said spool and the direction of rotation thereof, a display, an operation key, a microcomputer, a power source; and a waterproof housing constituted by a horizontal part and a vertical part extending downward from on side of said horizontal part, said waterproof housing accommodating therein said informing mechanism and being supported between said right and left reel side plates with said horizontal part positioned forwardly of a fishing line winding region of said spool and above said level-wind device, and with said vertical part being positioned inside the reel side plate in which said power transmission mechanism and said clutch mechanism are not provided, wherein said operation key is provided on the upper surface of the distal end portion of said horizontal part, said display is provided on the central region of said horizontal part, and a thumb placing area is provided on the upper surface of the region of said horizontal part under which said vertical part is formed, said detector being disposed in said vertical part and being spaced a minute distance apart from a transmitting member provided on a flange of said spool.

3. A double-bearing fishing reel according to claim 2, wherein said power source is housed in the front-region of said vertical part constituting one part of said waterproof housing, and a cover for the power source housing portion which is removed and remounted when said power source is loaded or unloaded, is fitted into a through-hole formed in the other reel side plate such that said cover is exposed on the surface of said reel side plate.

* * * * *